(12) United States Patent
Pan et al.

(10) Patent No.: US 8,972,645 B2
(45) Date of Patent: Mar. 3, 2015

(54) REQUEST SENT TO STORAGE DEVICE BASED ON MOVING AVERAGE

(71) Applicant: Hewlett-Packard Development Company, Houston, TX (US)

(72) Inventors: Weimin Pan, Houston, TX (US); Mark Lyndon Oelke, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 13/622,942

(22) Filed: Sep. 19, 2012

(65) Prior Publication Data

US 2014/0082249 A1 Mar. 20, 2014

(51) Int. Cl.
*G06F 13/36* (2006.01)
*G06F 13/00* (2006.01)
*G06F 13/28* (2006.01)

(52) U.S. Cl.
USPC .......................................... 710/308; 711/138

(58) Field of Classification Search
CPC ..... G06F 13/16; G06F 13/28; G06F 13/4027; G06F 13/4022; G06F 13/385; G06F 13/4059; G06F 12/0888; G06F 12/0897; G06F 12/0859; G06F 12/0866; G06F 9/3802
USPC .......................................... 710/308; 711/138
See application file for complete search history.

(56) References Cited

U.S. PATENT DOCUMENTS

| | | | | |
|---|---|---|---|---|
| 4,500,954 A | * | 2/1985 | Duke et al. ..................... | 711/138 |
| 4,956,803 A | * | 9/1990 | Tayler et al. .................. | 711/113 |
| 5,625,793 A | | 4/1997 | Mirza | |
| 5,694,570 A | * | 12/1997 | Beardsley et al. ............ | 711/113 |
| 5,706,465 A | * | 1/1998 | Kurokawa et al. ............ | 711/123 |
| 5,764,945 A | * | 6/1998 | Ballard ......................... | 711/113 |
| 5,937,174 A | * | 8/1999 | Weber .......................... | 710/312 |
| 6,055,613 A | * | 4/2000 | Parady .......................... | 711/165 |
| 6,195,744 B1 | * | 2/2001 | Favor et al. ................... | 712/215 |
| 6,356,980 B1 | * | 3/2002 | Arimilli et al. ............... | 711/138 |
| 6,401,187 B1 | * | 6/2002 | Motokawa et al. ........... | 711/213 |
| 6,418,516 B1 | * | 7/2002 | Arimilli et al. ............... | 711/138 |
| 7,228,388 B2 | | 6/2007 | Hu et al. | |
| 7,467,377 B2 | * | 12/2008 | Wu et al. ....................... | 717/154 |
| 7,584,336 B2 | | 9/2009 | Tremaine | |
| 7,978,628 B2 | | 7/2011 | Bugenhagen | |
| 2002/0156972 A1 | * | 10/2002 | McKnight et al. ............ | 711/114 |

(Continued)

FOREIGN PATENT DOCUMENTS

| | | | | | |
|---|---|---|---|---|---|
| JP | 02032436 A | * | 2/1990 | ............. | G06F 12/08 |
| JP | 05274223 A | * | 10/1993 | ............. | G06F 12/08 |
| JP | 10133948 A | * | 5/1998 | ............. | G06F 12/08 |

OTHER PUBLICATIONS

"NN9311335: Scheme to Bypass Cache for Big, One Time Reads", Nov. 1, 1993, IBM, IBM Technical Disclosure Bulletin, vol. 36, Iss. 11, pp. 335-336.*

(Continued)

*Primary Examiner* — Faisal M Zaman
(74) *Attorney, Agent, or Firm* — Hewlett-Packard Patent Department

(57) ABSTRACT

Embodiments herein relate to sending a request to a storage device based on a moving average. A threshold is determined based on a storage device type and a bandwidth of a cache bus connecting a cache to a controller. The moving average of throughput is measured between the storage device and a host. The request of the host to access the storage device is sent directly to the storage device, if the moving average is equal to the threshold.

19 Claims, 4 Drawing Sheets

(56) References Cited

U.S. PATENT DOCUMENTS

| | | |
|---|---|---|
| 2004/0117441 A1* | 6/2004 | Liu et al. ............... 709/203 |
| 2005/0144382 A1* | 6/2005 | Schmisseur ............ 711/114 |
| 2005/0210202 A1* | 9/2005 | Choubal et al. ........ 711/138 |
| 2006/0059314 A1* | 3/2006 | Bouchard et al. ...... 711/138 |
| 2006/0179240 A1* | 8/2006 | Chatterjee et al. ..... 711/138 |
| 2008/0022051 A1* | 1/2008 | Osanai et al. .......... 711/138 |
| 2008/0104329 A1* | 5/2008 | Gaither et al. ......... 711/138 |
| 2011/0213923 A1 | 9/2011 | Ledford |
| 2012/0059994 A1* | 3/2012 | Montgomery et al. .. 711/119 |
| 2012/0124294 A1 | 5/2012 | Atkisson et al. |
| 2012/0237133 A1* | 9/2012 | Jeong ..................... 382/236 |
| 2013/0318283 A1* | 11/2013 | Small et al. ............ 711/103 |

OTHER PUBLICATIONS

"NN9303483: Fast Dual Write", Mar. 1, 1993, IBM, IBM Technical Disclosure Bulletin, vol. 36, Iss. 3, pp. 483-486.*

Drapeau, A.L. et al., RAID-II: a High-bandwidth Network File Server, (Research Paper), Apr. 18-21, 1994.

* cited by examiner

REQUEST SENT TO STORAGE DEVICE BASED ON MOVING AVERAGE

BACKGROUND

Storage device controllers, such as RAID controllers, may be associated with a cache. A host seeking to write data to or read data from a storage device, may access the cache instead of the storage device, in order to reduce latency and increase performance. Manufacturers and/or vendors are challenged to provide more effective methods for reducing latency and increasing performance.

BRIEF DESCRIPTION OF THE DRAWINGS

The following detailed description references the drawings, wherein.

DETAILED DESCRIPTION

Figure 1:
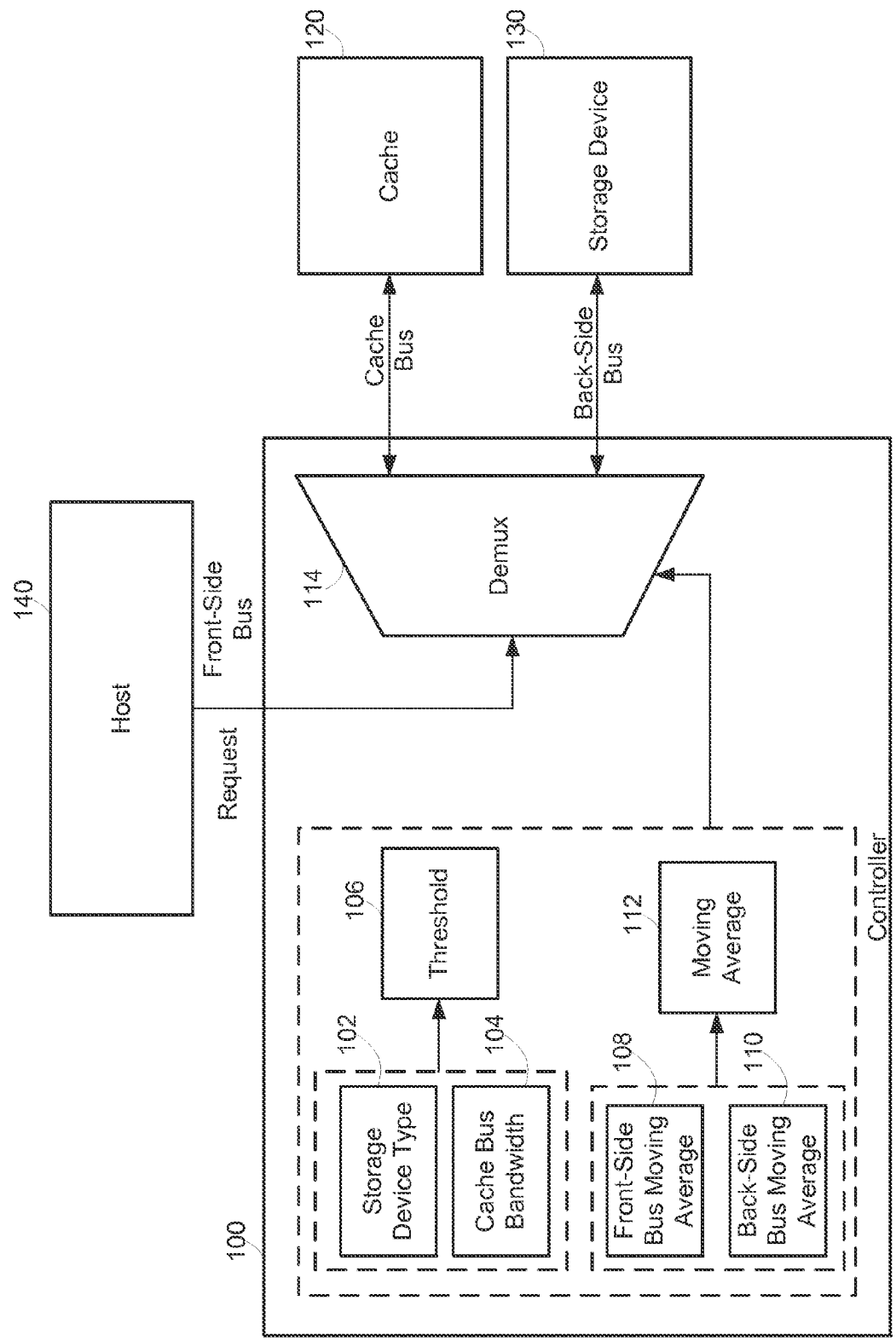
FIG. 1 is an example block diagram of a controller.

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Storage device controllers, such as RAID controllers, may be associated with a cache. The controller may direct a host seeking to write data to or read data from a storage device to the cache instead of the storage device, in order to reduce latency and increase performance. However, in certain situations, accessing the cache instead of the storage device may actually increase latency and decrease performance, due to bandwidth limitations of a cache bus connecting the cache to the controller.

For example, a RAID controller may receive a request to write data from a host along a front-side bus and transmit the request (along with accompanying write data) to the cache via the cache bus. Then, the RAID controller may read the request (along with the accompanying write data) from the cache to the storage device, thus causing the request (along with accompanying write data) to be retransmitted along the cache bus and then transmitted along a back-side bus that connects the RAID controller to the storage device. For example, for a RAID 0 volume, the RAID controller may read the cache once, in order to transmit the request (along with the accompanying write data) to a single drive. For a RAID 1 volume, the RAID controller may read the cache twice, in order to transmit the request (along with the accompanying write data) to two drives.

Thus, the bandwidth for the request to write data may be doubled (one write and one read) or tripled (one write and two reads) along the cache bus, compared to that of the front-side or back-side bus. If a bandwidth capacity of the cache bus is also double or triple that of the front-side or back-side bus, this may not be an issue. However, when a bandwidth capacity of the cache bus is less than double or triple that of the front-side or back-side bus, the cache bus may act as a bottleneck.

In this case, it may be faster for the controller to bypass the cache altogether and send the request (along with the accompanying write data) directly to the storage device. However, current firmware may be slow to detect when to bypass the cache, due to the current firmware accounting for a multitude of factors and thus consuming many CPU cycles of the controller. Further, the current firmware may not even accurately detect when to bypass the cache, because the multitude of factors may not be a reliable indicator of when the cache should be bypassed.

Embodiments may determine more quickly and accurately when to bypass the cache and send information of the host directly to the storage device. For example, in an embodiment, a threshold is determined based on a storage device type and a bandwidth of a cache bus connecting a cache to a controller. Also, a moving average of throughput is measured between a storage device and a host. Lastly, a request of the host to access the storage device is sent directly to the storage device, if the moving average is equal to the threshold. The moving average may be measured easily and quickly. Further, comparing the moving average to the threshold may provide a reliable indicator of when to bypass the cache. Thus, embodiments may determine when to bypass the cache more accurately and using less controller CPU cycles.

Referring now to the drawings, FIG. 1 is an example block diagram of a controller 100. The controller 100 may couple to or be included in any type of computing device that interfaces with a memory, such as a secure microprocessor, a notebook computer, a desktop computer, an all-in-one system, a server, a network device, a wireless device and the like. In the embodiment of FIG. 1, controller 100 connects to a host 140, a cache 120 and a storage device 130.

The controller 100 may include, for example, a hardware device including electronic circuitry for implementing the functionality described below, such as control logic and/or memory. In addition or as an alternative, the controller 100 may be implemented as a series of instructions encoded on a machine-readable storage medium and executable by a processor. For example, the controller module 102 may independently run an application and/or operating system (OS) for interfacing with the cache 120, storage device 130 and/or host 140.

The host 140 may refer to any type of device that seeks to access the storage device 130, such as a main processor of a computer or a computer connected to a computer network. The storage device 130 may be any electronic, magnetic, optical, or other physical storage device that contains or stores executable instructions, such as a hard disk drive (HDD), solid-state drive (SSD) and the like The cache 120 may be any type of device to store data to be written to and/or read from the storage device 130 so that requests from the host 140 to write and/or read data can be served faster. For example, data writes to and/or reads from the cache 120 may have a lower latency than that of the storage device 130. For instance, the cache 120 may include double data rate (DDR) RAM while the storage device 130 may include a HDD.

The controller 100 is to receive a request along a front-side bus from the host 140 to access the storage device 130. The controller 100 is to connect to the storage device 130 via a back-side bus. The cache 120 is coupled to the controller 100 along a cache bus. The front-side, back-side and cache buses may be any type of subsystem and/or interface that allows for transfer of data between components, such as a controller, host, cache and/or storage device.

The controller 100 is to set a threshold 106 based on a bandwidth 104 of the cache bus and a storage device type 102. The bandwidth 104 of the cache bus may refer to a maximum bandwidth capacity of the cache bus. Further, the controller 104 is to set the threshold 106 to be less than the bandwidth 104 of the cache bus. For example, the controller 100 may divide the bandwidth 104 of the cache bus by a whole number in order to calculate the threshold 106, where the whole number is determined based on the storage device type 102. The threshold 106 will be explained in greater detail below with respect to FIG. 2.

The controller 100 is to also determine a moving average of throughput 112 along at least one of the front-side and back-side buses. For example, the controller 110 may measure and store a front-side bus moving average 108 and a back-side bus moving average 110. Then, the controller 100 may determine the moving average 112 to be a lower of the front-side and back-side bus averages 108 and 110, assuming the front-side and back-side buses have different moving averages of throughput. The front-side and back-side bus averages 108 and 110 may be similar if the front-side and back-side buses have not reached their bandwidth capacity. In one embodiment, the controller 100 may communicate with the storage device 130 via a Serial Attached SCSI (SAS) connection and may communicate with the host 140 via a Peripheral Component Interconnect (PCI) connection.

The moving average 112 may refer to an average of the throughput over a specific period of time, such as a Simple Moving Average (SMA) and/or the Exponential Moving Average (EMA). As explained above, the moving average 112 may be determined by taking a lower of the average throughputs of the front-side and back-side buses 108 and 110. The average throughputs 108 and 110 may be measured, for example, in bits per second and continuously updated to include the most recent data points for the elapsed, specific period of time, such as the past sixty seconds.

The controller 100 is to send the request directly to the storage device 130 if the moving average 112 is equal to the threshold 106. This is because the moving average 112 reaching the threshold 106 would indicate that the cache bus is operating at maximum bandwidth capacity. Thus, in order to allow for the moving average 112 to exceed the threshold, the controller 100 may bypass the cache 120 by sending the request directly to the storage device 130. If the request relates to a write access, the controller 100 may also send any data of the host 140 to be written directly to the storage device 130.

However, the controller 100 is to send the request to the cache 120 instead if the moving average 112 is less than the threshold 106. In this case, the controller 100 is to write data from the host 140 to the cache 120 and then read the written data from the cache 120 to the storage device 130, if the request relates to a write access. As shown in FIG. 1 the controller is shown to include a demultiplexer (demux) 114 to output to one of the cache bus and the back-side bus. The demux 114 further receives the request as an input via the front-side bus and selects between the cache bus and the back-side bus based on a comparison between the threshold 106 and moving average 112. The comparison of the threshold 106 and moving average 112 will be explained in greater detail below with respect to FIG. 2. Further, while FIG. 1 shows a demux, embodiments are not limited thereto and may include any type of component capable of selecting between two outputs, such as a switch.

In embodiments, the term equal may refer to values that are substantially close but not exactly the same. For example, the controller 100 may determine the moving average 112 to be equal to the threshold 106 if a difference between the moving average 112 and the threshold 106 is less than a specific value, such as 0.1 gigahertz (GHz) and/or less than a specific percentage, such as one percent of the threshold 106. The specific value and/or specific percentage may be calculated based on a delay, such as a delay of the demux 114 in switching between the cache-bus and back-side bus, so as to avoid the moving average 112 being limited by the threshold 106 of cache-side bus.

Figure 2:
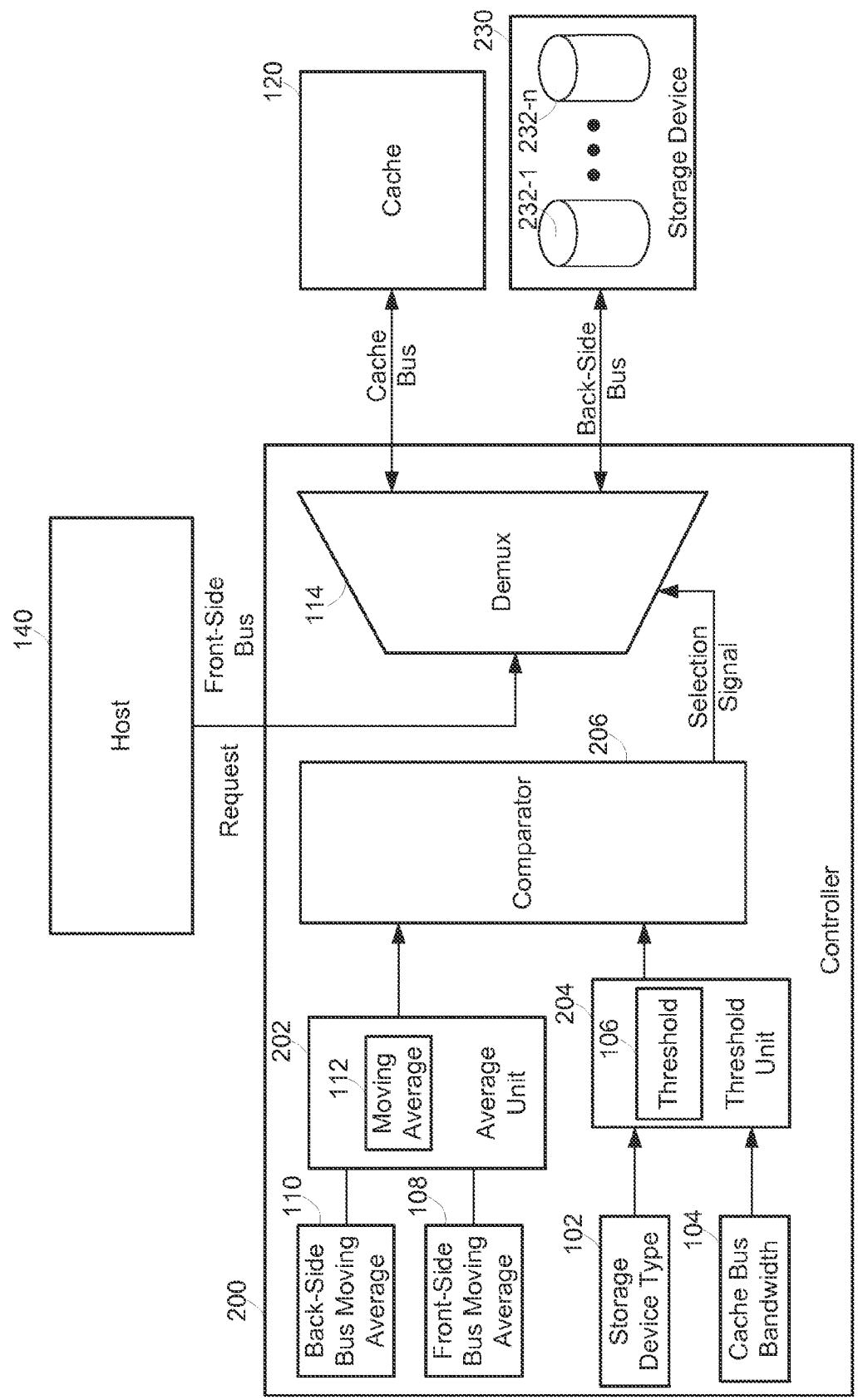
FIG. 2 is another example block diagram of a controller.

FIG. 2 is another example block diagram of a controller 200. The controller 200 may couple to or be included in any type of computing device that interfaces with a memory, such as a secure microprocessor, a notebook computer, a desktop computer, an all-in-one system, a server, a network device, a wireless device and the like. In the embodiment of FIG. 2, the controller 200 connects to a host 140, a cache 120 and a storage device 230.

The host 140 and the cache 120 of FIG. 2 may be similar to the host 140 and the cache 120 of FIG. 1. Further, the controller 200 and the storage device 230 of FIG. 2 may include at least the functionality and/or hardware of the controller 100 and the storage device 130 of FIG. 1. For example, the controller 200 includes the demux 114 of FIG. 1. The controller 200 also includes an average unit 202, a threshold unit 204 and a comparator 206. The average unit 202, threshold unit 204 and comparator 206 may include, for example, a hardware device including electronic circuitry for implementing the functionality described below, such as control logic and/or memory. In addition or as an alternative, the average unit 202, threshold unit 204 and comparator 206 may be implemented as a series of instructions encoded on a machine-readable storage medium and executable by a processor.

The average unit 202 is to receive and compare the back-side bus moving average 110 and the front-side bus moving average 108 measured by the controller 200. Further, the average unit 202 is to output as the moving average 112 a lower of the back-side bus moving average 110 and the front-side bus moving average 108. If the back-side bus moving average 110 and the front-side bus moving average 108 are the same, the average unit 202 may output either of the back-side bus moving average 110 and the front-side bus moving average 108 as the moving average 112.

The threshold unit 204 is to calculate and output the threshold 106 based on the storage device type 102 and the cache bus bandwidth 104, as explained above in FIG. 1 and in further detail below. The comparator 206 is to compare the moving average 112 output by the average unit 202 and the threshold 106 output by the threshold unit 204. Further, the comparator 206 is to output a selection signal at a first level if the moving average 112 is less than the threshold 106 and to output the selection level at a second level if the moving average 112 is equal to (or greater) than the threshold 106.

The demux 114 may select one of the cache and back-side bus to connect to the front-side bus based on the selection signal. For example, the demux 114 may output the request (and associated data) of the host 140 to the cache 120 if the selection signal is at the first level and output the request (and associated data) of the host 140 to the storage device 230 if the selection signal is at the second level. The first level may be one of a high and low logic level and the second level may be an other (or remainder) of the high and low logic level.

The controller 200 may receive a plurality of requests. The plurality of requests may include read and/or write accesses to sequential and/or random addresses of the storage device 230. The storage device 230 is shown to further include a plurality of drives 232-1 to 232-n, where n is a natural number. The plurality of drives 232-1 to 232-n may refer to storage mechanisms with fixed or removable media, such as separate HDDs and the like. The storage device type 102 may further be based on a number of drives of the storage device 230 the controller 200 is to access per request. For example, the plurality of drives 232-1 to 232-n of the storage device 230 may define a structure referred to as a redundant array of independent disks (RAID). In this case, the storage device type 102 may identify a level of a RAID volume. The term volume may refer to a single accessible storage area with a single file system. While a volume may occupy an area different from a physical disk drive, it may be still accessed with an operating system's logical interface.

For example, a RAID 0 volume includes block-level striping without parity or mirroring and no redundancy. A RAID 1 volume includes mirroring without parity or striping. In this case, data is written identically to two drives, such as two of the drives 232-1 to 232-n, thereby producing a mirrored set of data. A request from the host 140 related to read access may be serviced by either of the two drives 232-1 and 232-2 containing the requested data. Further, a request from the host 140 related to write access updates the strips of both drives 232-1 and 232-2. A RAID 10 volume includes mirroring and striping, where data is written in stripes across the primary drives and then mirrored to the secondary drives. For example, a typical RAID 10 configuration may consist of two primary drives and two secondary drives.

Thus, if data to be written to storage device 230 is first written to the cache 120, the controller 200 accesses the cache 120 a first time to write the data of the host 140 thereto. Then, in one embodiment, the controller 200 accesses the cache 120 a second time to read the written data to the storage device 230, such as for a RAID 0 volume. However, in another embodiment, the controller 200 may access the cache 120 multiple times to read the written to the storage device 230. For example, the controller 200 may access cache 120 a second time to read the written data to a first drive 232-1 of the storage device 230 and then a third time to read the written data to a second drive 232-2 of the storage device 230, such as for a RAID 1 or RAID 10 volume. Thus, for every request related to write access from the host 140, data may be transmitted across the cache bus either two times (1 write access and 1 read access) for a RAID 0 volume or three times (1 write access and 2 read accesses) for a RAID 1 or 10 volume.

Thus, the threshold unit 204 may set the threshold 106 to be half of the bandwidth 104 of the cache bus, if the storage device 230 includes a RAID 0 volume. Further, the threshold unit 204 may to set the threshold 106 to be one-third of the bandwidth 104 of the cache bus, if the storage device 230 includes a RAID 1 or RAID 10 volume. However, the threshold 106 may generally only be set to be half or third of the bandwidth 104 of the cache bus, if the plurality of requests includes a plurality of sequential write accesses. This is because only write accesses may require the additional reads from the cache 120 to the storage device 230. Further, only sequential accesses, instead of random accesses, may be fast enough to tax a buffer queue of the cache 120.

Thus, the threshold unit 204 may set the threshold to be greater than half of the bandwidth 104 of the cache bus (but still less than a full bandwidth 104 of the cache bus), if the storage device 230 includes a RAID 0 volume and the plurality of requests are a mix of read and write accesses. Similarly, the threshold unit 204 may set the threshold to be greater than one-third of the bandwidth 104 of the cache bus (but still less than a full bandwidth 104 of the cache bus), if the storage device 230 includes a RAID 1 or RAID 10 volume and the plurality of requests are a mix of read and write accesses. This is because requests related to read accesses may only require data may be transmitted across the cache bus one time from the cache 120 to the host 140, unlike requests related to write accesses, which may require data to be transmitted 2 or 3 times.

Figure 3:
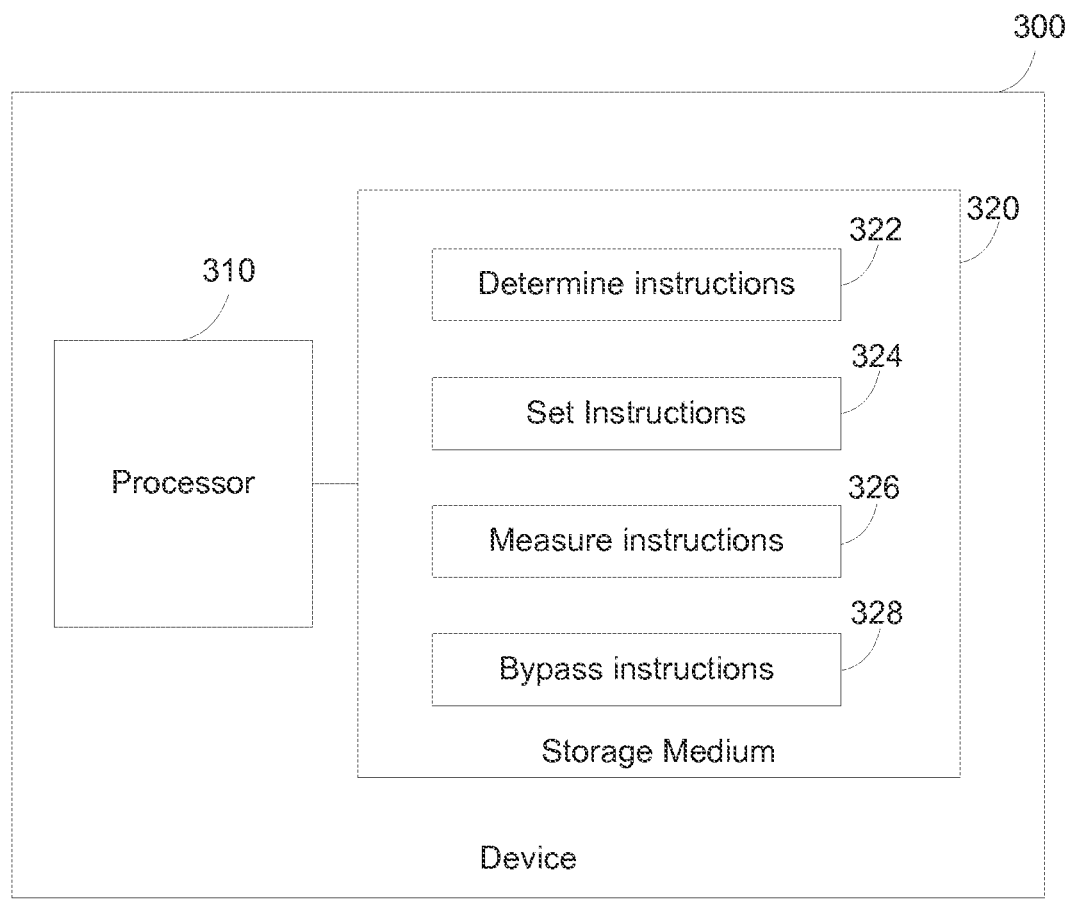
FIG. 3 is an example block diagram of a computing device including instructions for sending a request to a storage device based on a moving average.

FIG. 3 is an example block diagram of a computing device 300 including instructions for sending a request to a storage device based on a moving average. In the embodiment of FIG. 3, the computing device 300 includes a processor 310 and a machine-readable storage medium 320. The machine-readable storage medium 320 further includes instructions 322, 324, 326 and 328 for sending the request to the storage device based on the moving average.

The computing device 300 may be, for example, a secure microprocessor, a notebook computer, a desktop computer, an all-in-one system, a server, a network device, a wireless device, or any other type of user device capable of executing the instructions 322, 324, 326 and 328. In certain examples, the computing device 300 may include or be connected to additional components such as memories, sensors, displays, etc.

The processor 310 may be, at least one central processing unit (CPU), at least one semiconductor-based microprocessor, at least one graphics processing unit (GPU), other hardware devices suitable for retrieval and execution of instructions stored in the machine-readable storage medium 320, or combinations thereof. The processor 310 may fetch, decode, and execute instructions 322, 324, 326 and 328 to implement sending the request to the storage device based on the moving average. As an alternative or in addition to retrieving and executing instructions, the processor 310 may include at least one integrated circuit (IC), other control logic, other electronic circuits, or combinations thereof that include a number of electronic components for performing the functionality of instructions 322, 324, 326 and 328.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for sending the request to the storage device based on the moving average.

Figure 4:
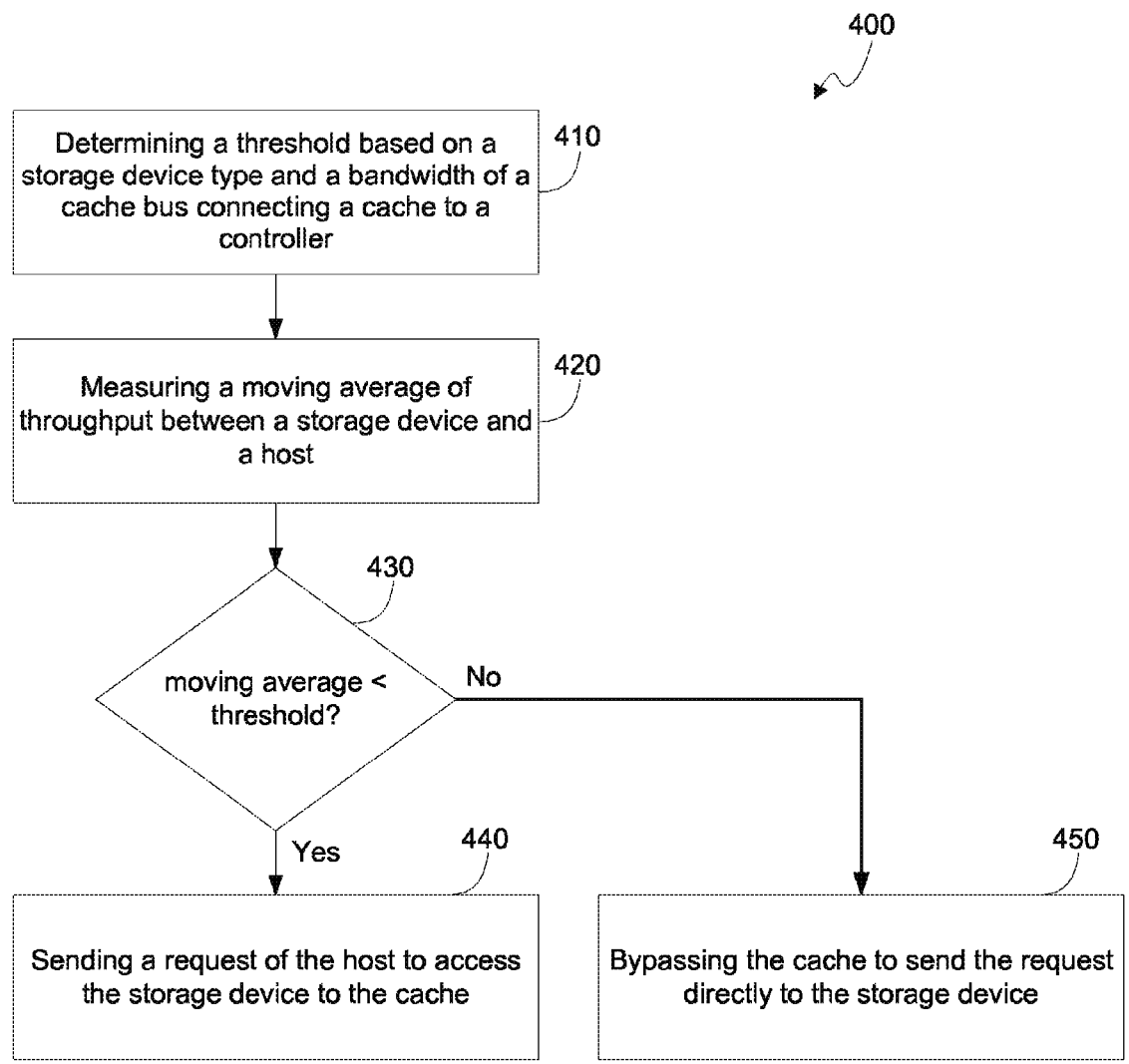
FIG. 4 is an example flowchart of a method for sending a request to a storage device based on a moving average.

Moreover, the instructions 322, 324, 326 and 328 when executed by a processor (e.g., via one processing element or multiple processing elements of the processor) can cause the processor to perform processes, such as, the process of FIG. 4. For example, the determine instructions 322 may be executed by the processor 310 to determine a bandwidth of a cache bus connecting a cache (not shown) to a controller (not shown). The set instructions 324 may be executed by the processor 310 to set a threshold based on the determined bandwidth and a type of redundant array of independent disks (RAID) volume included in a storage device (not shown). The measure instructions 326 may be executed by the processor 310 to measure a moving average of throughput along at least one of a front-side (not shown) and a back-side bus (not shown). The front-side bus is to connect a host (not shown) to the controller and the back-side bus is to connect the controller to the storage device.

The bypass instructions 328 may be executed by the processor 310 to bypass the cache by sending a request from the host directly to the storage device via the controller, if the moving average is equal to (or greater than) the threshold. The machine-readable storage medium 320 may also include instructions (not shown) to send the request from the host to the cache via the controller, if the moving average is less than the threshold. The threshold is set before the moving average is measured and the moving average may be continuously compared to the threshold. The threshold, storage device type, and moving average are explained in greater detail above with respect to FIGS. 1 and 2.

FIG. 4 is an example flowchart of a method 400 for sending a request to a storage device based on a moving average. Although execution of the method 400 is described below with reference to the controller 200, other suitable components for execution of the method 400 can be utilized, such as the controller 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the controller determines 200 a threshold 106 based on a storage device type 102 and a bandwidth 104 of a cache bus connecting a cache 120 to the controller 200. The storage device type 102 may be based on a number of times the cache 120 is to be accessed by the storage device 230 for the request. For example, the determining, at block 410, may set the threshold 106 to be half of the bandwidth 104 of the cache bus, if the storage device 230 includes a RAID 0 volume, or one-third of the bandwidth 104 of the cache bus, if the storage device 230 includes at least one of a RAID 1 and a RAID 10 volume.

Then, at block 420, the controller 200 measures a moving average of throughput 112 between a storage device 230 and a host 140. The moving average 112 may relate to measuring a throughput of data being written to the storage device 230. The threshold 106, storage device type 102, and moving average 112 are explained in greater detail above with respect to FIGS. 1 and 2.

Next, the method 400 flows to block 430 to determine if the moving average 112 is less than the threshold 106. If the moving average 112 is less than the threshold 106, the controller 200 sends a request of the host 140 to access the storage device 230 to the cache 120, at block 440. Otherwise, if the moving average 112 is equal to (or greater) than the threshold 106, the controller 200 bypasses the cache 102 to send the request directly to the storage device 230, at block 450. The request may relate to writing data of the host 140 to the storage device 230.

According to the foregoing, embodiments provide a method and/or device for determining more quickly and accurately when to bypass the cache and to send information of the host directly to the storage device. A moving average may be measured relatively easily and quickly. Further, comparing the moving average to a threshold based on a storage device type and a bandwidth of a cache bus, may provide a reliable indicator of when to bypass the cache. Thus, embodiments may determine when to bypass the cache more accurately and using less controller CPU cycles.

We claim:

1. A device comprising:
a controller to receive a request along a front-side bus from a host to access a storage device, the controller to connect to the storage device via a back-side bus; and
a cache coupled to the controller along a cache bus, wherein
the controller is to set a threshold based on a bandwidth of the cache bus and a storage device type,
the controller is to set the threshold to be less than the bandwidth of the cache bus,
the controller is to determine a moving average of throughput along at least one of the front-side and back-side buses, and
the controller is to send the request directly to the storage device if the moving average is equal to the threshold.

2. The device of claim 1, wherein,
the controller is to send the request to the cache if the moving average is less than the threshold, and
the controller is to write data from the host to the cache and read the written data from the cache to the storage device, if the request is a write access and the controller sends the request to the cache.

3. The device of claim 1, wherein the controller is to determine the moving average based on a lower throughput of the front-side and back-side buses, if the front-side and back-side buses have different throughputs.

4. The device of claim 1, wherein the storage device type identifies a number of drives of the storage device the controller is to access per request.

5. The device of claim 1, wherein,
the storage device includes a redundant array of independent disks (RAID),
the storage device type identifies a level of a RAID volume,
the controller is to receive a plurality of requests, and
the plurality of requests are at least one of read and write accesses to at least one of sequential and random addresses of the storage device.

6. The device of claim 5, wherein,
the controller is to set the threshold to be half of the bandwidth of the cache bus, if the storage device includes a RAID 0 volume and the plurality of requests includes a plurality of sequential write accesses, and
the controller is to set the threshold to be one-third of the bandwidth of the cache bus, if the storage device includes at least one of a RAID 1 and RAID 10 volume and the plurality of requests includes a plurality of sequential write accesses.

7. The device of claim 5, wherein,
the controller is to set the threshold to be greater than half of the bandwidth of the cache bus, if the storage device includes a RAID 0 volume and the plurality of requests are a mix of read and write accesses, and
the controller is to set the threshold to be greater than one-third of the bandwidth of the cache bus, if the storage device includes at least one of a RAID 1 and RAID 10 volume and the plurality of requests are a mix of read and write accesses.

8. The device of claim 1, wherein the moving, average is measured in bits per second over a period of approximately sixty seconds.

9. The device of claim 1, wherein,
the controller is to communicate with the storage device via a Serial Attached SCSI (SAS) connection and to communicate with the host via a Peripheral Component Interconnect (PCI) connection, and
the cache includes a double data rate (DDR) memory.

10. A method, comprising:
   determining a threshold based on a storage device type and a bandwidth of a cache bus connecting a cache to a controller;
   measuring a moving average of throughput between a storage device and a host;
   sending a request of the host to access the storage device to the cache, if the moving average is less than the threshold; and
   bypassing the cache to send the request directly to the storage device, if the moving average is equal to the threshold.

11. The method of claim 10, wherein,
   the request relates to writing data of the host to the storage device,
   the moving average relates to measuring a throughput of data being written to the storage device, and
   the storage device type is based on a number of times the cache is to be accessed by the storage device for the request.

12. The method of claim 10, wherein,
   the determining is to set the threshold to be half of the bandwidth of the cache bus, if the storage device includes a RAID 0 volume, and
   the determining is to set the threshold to be one-third of the bandwidth of the cache bus, if the storage device includes at least one of a RAID 1 and a RAID 10 volume.

13. The method of claim 10, further comprising,
   setting the threshold to be half of the bandwidth of the cache bus, if the storage device includes a RAID 0 volume and a plurality of requests includes a plurality of sequential write accesses, and
   setting the threshold to be one-third of the bandwidth of the cache bus, if the storage device includes at least one of a RAID 1 and RAID 10 volume and the plurality of requests includes a plurality of sequential write accesses.

14. The method of claim 10, further comprising,
   setting the threshold to be greater than half of the bandwidth of the cache bus, if the storage device includes a RAID 0 volume and a plurality of requests are a mix of read and write accesses, and
   setting the threshold to be greater than one-third of the bandwidth of the cache bus, if the storage device includes at least one of a RAID 1 and RAID 10 volume and the plurality of requests are a mix of read and write accesses.

15. A non-transitory computer-readable storage medium storing instructions that, if executed by a processor of a device, cause the processor to:
   determine a bandwidth of a cache bus connecting a cache to a controller;
   set a threshold based on the determined bandwidth and a type of redundant array of independent disks (RAID) volume included in a storage device;
   measure a moving average of throughput along at least one of a front-side and a back-side bus, the front-side bus to connect a host to the controller and the back-side bus to connect the controller to the storage device; and
   bypass the cache by sending a request from the host directly to the storage device via the controller, if the moving average is equal to the threshold.

16. The non-transitory computer-readable storage medium of claim 15, wherein,
   the threshold is set before the moving average is measured, and
   the moving average is continuously compared to the threshold.

17. The non-transitory computer-readable storage medium of claim 15, further comprising instructions that, if executed by the processor, cause the processor to:
   send data from the host to the cache via the controller, if the moving average is less than the threshold.

18. The non-transitory computer-readable storage medium of claim 15, wherein,
   the threshold is set to be half of the bandwidth of the cache bus, if the storage device includes a RAID 0 volume and a plurality of requests includes a plurality of sequential write accesses, and
   the threshold is set to be one-third of the bandwidth of the cache bus, if the storage device includes at least one of a RAID 1 and RAID 10 volume and the plurality of requests includes a plurality of sequential write accesses.

19. The non-transitory computer-readable storage medium of claim 15, wherein,
   the threshold is set to be greater than half of the bandwidth of the cache bus, if the storage device includes a RAID 0 volume and a plurality of requests are a mix of read and write accesses, and
   the threshold is set to be greater than one-third of the bandwidth of the cache bus, if the storage device includes at least one of a RAID 1 and RAID 10 volume and the plurality of requests are a mix of read and write accesses.

* * * * *

UNITED STATES PATENT AND TRADEMARK OFFICE
CERTIFICATE OF CORRECTION

| | | |
|---|---|---|
| PATENT NO. | : 8,972,645 B2 | Page 1 of 1 |
| APPLICATION NO. | : 13/622942 | |
| DATED | : March 3, 2015 | |
| INVENTOR(S) | : Weimin Pan et al. | |

It is certified that error appears in the above-identified patent and that said Letters Patent is hereby corrected as shown below:

In the Claims

In column 8, line 59, in Claim 8, delete "moving," and insert -- moving --, therefor.

Signed and Sealed this
Twenty-fifth Day of August, 2015

Michelle K. Lee
*Director of the United States Patent and Trademark Office*